J. Firmenich.
Fermenting Vat.
No. 94,880. Patented Sep. 14, 1869.
Fig: 3.
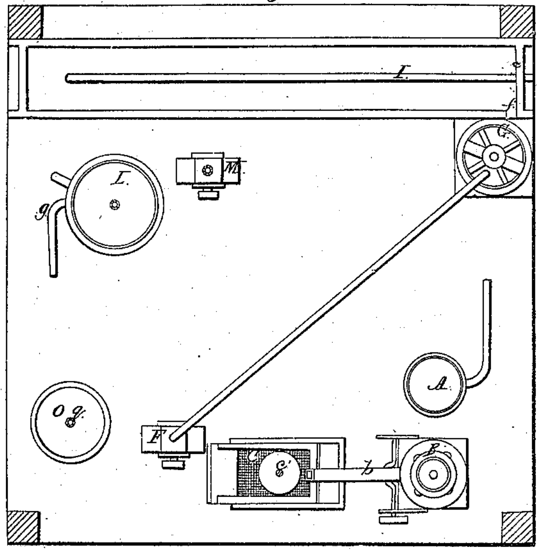
Fig: 1.
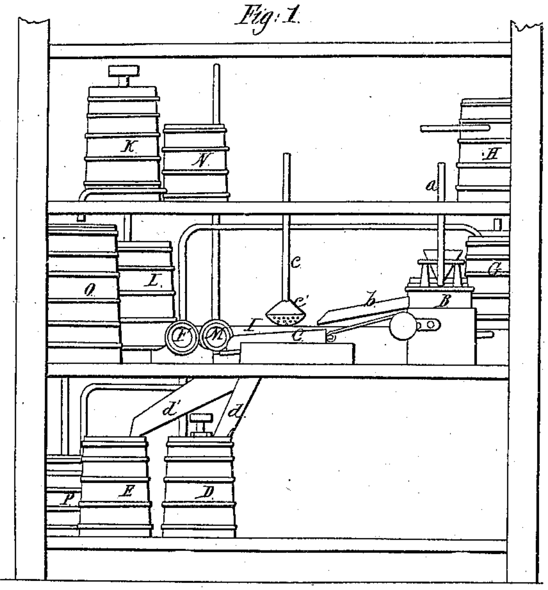
Fig: 4.
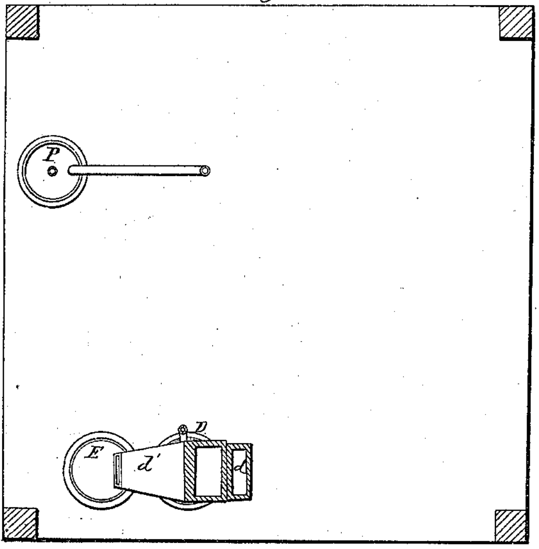
Fig: 2.
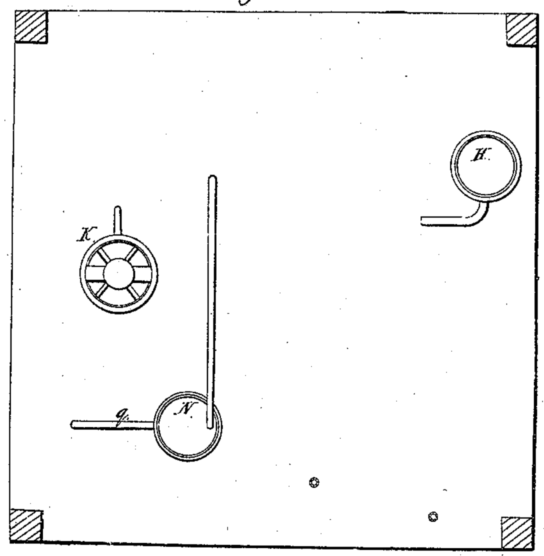
Witnesses:
J. R. Drake
W. J. Chamberlain
Inventor:
J. Firmenich
by
J. Fraser & Co
attys.
N. PETERS, PHOTO-LITHOGRAPHER, WASHINGTON, D. C.

United States Patent Office.

JOSEPH FIRMENICH, OF BUFFALO, NEW YORK.

*Letters Patent No.* 94,880, *dated September* 14, 1869.

IMPROVEMENT IN THE MANUFACTURE OF BEER, ALE, AND OTHER FERMENTED LIQUORS.

The Schedule referred to in these Letters Patent and making part of the same.

*To all whom it may concern:*

Be it known that I, JOSEPH FIRMENICH, of the city of Buffalo, in the county of Erie, and State of New York, have invented a certain new and useful Improvement in the Process of Making Ale, Beer, and other Similar Liquors; and I do hereby declare that the following is a full and exact description thereof, reference being had to the accompanying drawings, making part of this specification.

My invention consists in producing ale, beer, and other similar liquors in the manner hereinafter described, whereby the process of malting may be dispensed with, and the product embody superior qualities, by retaining the sugar and discarding the gluten to the maximum degree.

The drawings represent my apparatus for producing this result.

Figure 1 represents a side elevation of the stories of a building containing the apparatus.

Figures 2, 3, and 4, plans of the several stories, commencing with the upper one.

Like letters of reference indicate corresponding parts in all the figures.

For producing the liquid, either corn, barley, or any other grain, separately, may be used, or either of them may be combined.

A indicates the vat in which the grain is placed for soaking. It is subjected to steam at from 130° to 150° a sufficient length of time to soften for grinding. The water is then drawn off, and the grain placed in grinding-mill B, where it is reduced to proper fineness.

During the process of grinding water is let on in a small stream, to the mill below the hopper, through pipe *a*. This is for the purpose of working the meal easily through the stories, and down the spout *b*; at the same time it helps to separate the starch.

From the spout the ground mass falls upon one or more reciprocating sieves C.

A water-pipe, *c*, rests over the sieve, with convex funnel-shaped head *c'* filled with perforations.

The water from this pipe, under pressure, diffuses variably and angularly over the whole surface of the sieve, and, by its force and washing action, stirs up and carries through the starch while the hulls and refuse are retained.

The starchy product passes down spout *d* into tank D, while the screenings pass down spout *d'* into receptacle E.

In tank D is an agitator, which, after the mass settles, and the water is drawn off, keeps the mass thoroughly mixed.

From thence it is raised by pump F to tank G, which has also an agitator.

A tank, H, is placed above G, wherein is placed, with a small quantity of hot water, one pound each, more or less, of soda-ash and lime to the bushel of grain used.

The soda-ash is, by small quantities at a time, dissolved by contact with steam.

When clear this liquor is run into tank G, and stirred up by the agitator for a few hours, or sufficiently to separate the gluten from the starch.

During the process of stirring, the mass is drawn off into zigzag gutters I, having a slight downward incline from induction at *e* to eduction at *f*. In running from one end to the other, the starch deposits upon the surface, while the gluten and other impurities are run off.

The starch is now collected from the gutter, and deposited in tank K, and one or more waters are applied, to wash out the alkali, this being accomplished by an agitator.

When thoroughly washed, the waste water is drawn off, and clear water let on sufficient to make a thick creamy solution, of such consistency as to run through a pipe into steaming-tank L, where about one pound of sulphuric acid to the bushel of grain used, with sufficient water to reach above the steam-pipe *g*, are placed.

Steam is let on, and the mass allowed to boil until it is converted into glucose or sirup of grape sugar.

When the conversion is effected marble dust, chalk, or other equivalent material, is introduced, to neutralize the sulphuric acid.

When the liquid has settled the clear product is drawn off, and is ready for use.

This combined liquor of corn and barley mixed, either during the process above described, or after the two products have been produced, is in condition for making ale or beer by the addition of hops, and the ordinary subsequent treatment; or either liquid may be used alone for the purpose; or the sirup or sugar of corn may have an admixture of ordinary malt-wort, as may be desired.

By this means I avoid the old process of malting the grain preparatory to producing the ale, while at the same time I produce a far superior article.

In the old process of producing ale and beer by the malting of the grain from four to six weeks are required. In my process the same can be accomplished in from four to five days with a great saving of labor and material.

In addition to the above, the article of ale and beer which I produce is in the highest degree free of gluten, which is removed and run off from the starch during the process; hence the product is very healthful. In a word, the starchy qualities are preserved to the uttermost, while the glutinous ones are avoided.

In the old practice of malting, the gluten necessarily all passes in with the sugar, and forms an undisguised element of the liquid, disagreeable to the taste, and deleterious to the health. In such cases also, the starch is but imperfectly converted into sugar.

I am not aware that ale and beer have ever before been produced otherwise than by the usual process of malting.

If desirable, this product may be reduced to a solid or nearly solid substance, and serve for use by diluting.

This liquor may also be employed for making vinegar, in which case it is drawn into tank P, and raised by pump M from tank P to tank N, and water applied to reduce to the proper degree, and yeast applied to produce fermentation.

From tank N the liquid is run slowly to acidifier O, which contains corn-cobs or equivalent, held up by partitions at proper distances apart.

What I claim as my invention, and desire to secure by Letters Patent, is—

1. The manufacture of ale, beer, porter, and other similar fermented liquors direct from grain, by the starch and saccharine process, either alone or combined with malt, substantially as herein described.

2. The combination of the several processes herein-described, for crushing the grain, separating the husk and non-starchy materials, the saccharification of the starch, and conversion of the same into ale, beer, porter, or other similar fermented liquors, all substantially as herein described.

In witness whereof, I have hereunto signed my name in the presence of two subscribing witnesses.

J. FIRMENICH.

Witnesses:

J. R. DRAKE,

ALBERT HAIGHT.